United States Patent [19]

Hulsing, II

[11] Patent Number: 4,968,909
[45] Date of Patent: Nov. 6, 1990

[54] COMPACT BI-DIRECTIONAL TORQUE MOTOR

[75] Inventor: Rand H. Hulsing, II, Redmond, Wash.

[73] Assignee: Sundstrand Data Control, Inc., Redmond, Wash.

[21] Appl. No.: 369,373

[22] Filed: Jun. 21, 1989

[51] Int. Cl.⁵ .................. H02K 33/12; G01P 9/04
[52] U.S. Cl. ..................... 310/17; 310/15; 73/505
[58] Field of Search ............. 310/15, 17, 36, 156; 73/505, 510

[56] References Cited

U.S. PATENT DOCUMENTS

| | | | |
|---|---|---|---|
| 3,312,842 | 4/1967 | Heuchling et al. | 310/17 |
| 3,671,787 | 6/1972 | Herron | 310/154 |
| 3,828,213 | 8/1974 | Yamashita et al. | 310/254 |
| 4,642,539 | 2/1987 | Hinds | 318/439 |
| 4,700,090 | 10/1987 | Bianchi et al. | 310/36 |

FOREIGN PATENT DOCUMENTS

| | | | |
|---|---|---|---|
| 0661693 | 5/1979 | U.S.S.R. | 310/36 |
| 0917094 | 3/1982 | U.S.S.R. | |

*Primary Examiner*—Steven L. Stephan
*Assistant Examiner*—Judson H. Jones
*Attorney, Agent, or Firm*—Michael S. Yatsko; Trevor B. Joike

[57] ABSTRACT

A compact torque motor providing bi-directional, limited angle reactionless torque to opposed structures. A motor (10, 150) includes an X-shaped core (12), and first and second pole pieces (14 and 16), which are disposed at opposite sides of the core. Two opposed legs on the X-shaped core (12) comprise a first core section (18), which is transverse to a similar second core section (20). A first electromagnetic coil (22) is formed on the first core section and a second electromagnetic coil (24) on the second core section. When the first and second electromagnetic coils are alternately energized, tabs (38, 40, 44, and 46) disposed approximate the ends of the first and second pole pieces are attracted to the resulting magnetic poles (26 and 28, 30 and 32), causing the pole pieces to counter-rotate back and forth about a central axis (48). Magnetic flux developed by the first and second electromagnetic coils is conveyed through the tabs and the first and second pole pieces between the opposite magnetic poles. Since the pole pieces are lightweight, rotational inertia of the motor is very low, and its efficiency relative high.

20 Claims, 3 Drawing Sheets

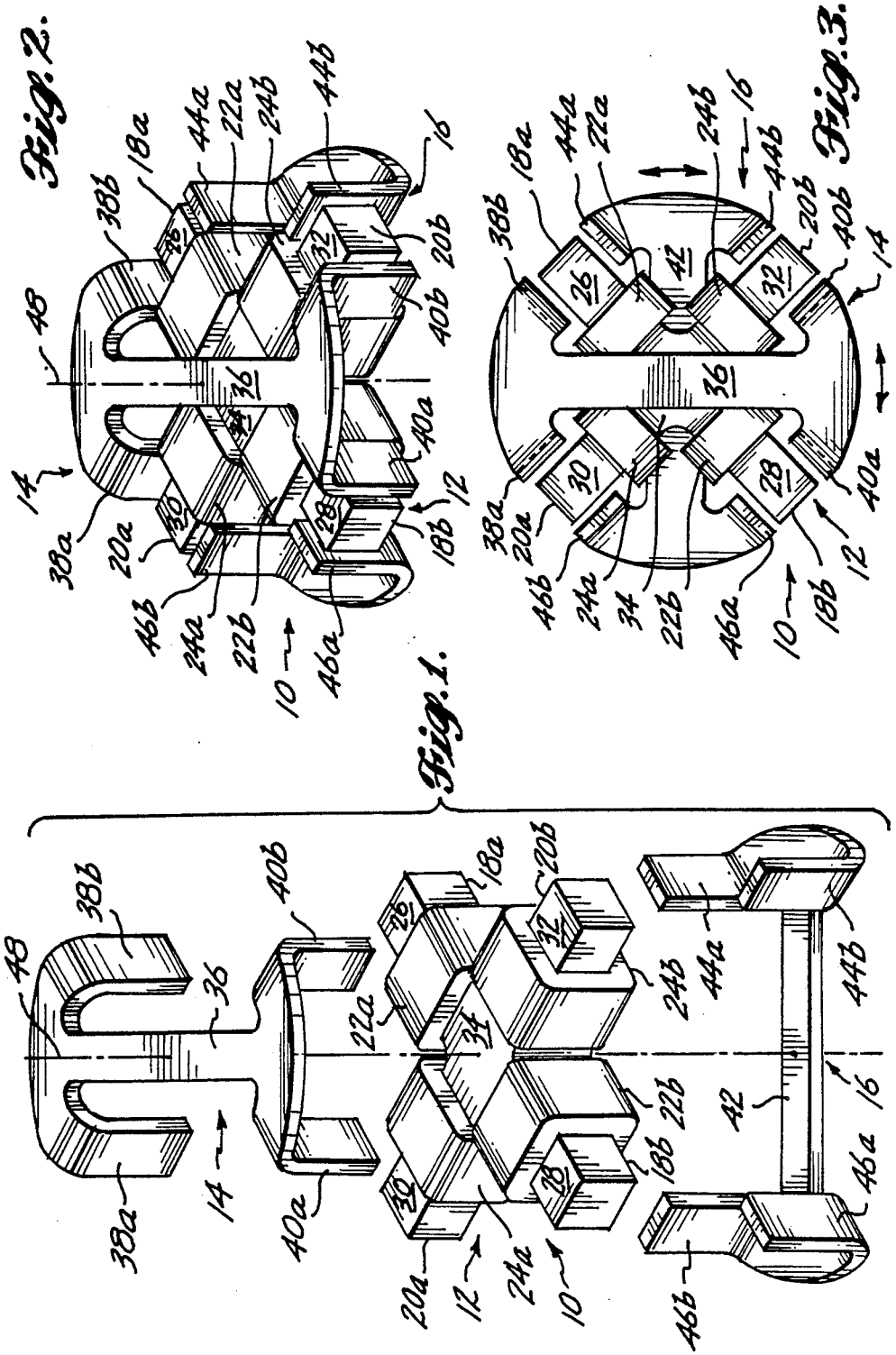

COMPACT BI-DIRECTIONAL TORQUE MOTOR

TECHNICAL FIELD

This invention generally pertains to electromagnetic motors, and particularly, to motors having a plurality of electromagnetic coils disposed on a fixed core and a rotor that is magnetically driven to rotate bi-directionally through a limited angle with respect to the core.

BACKGROUND OF THE INVENTION

A multi-axis angular rate sensor is disclosed in commonly assigned U.S. Pat. No. 4,821,572. In this device, a plurality of pairs of accelerometers are mounted on a first and second frame member for rotation about a common axis. The first and second frame members are counter-rotated about the common axis, without transmitting a reaction force to a supporting base that is interposed between the frame members.

The drive mechanism used to counter-rotate the frame members, as disclosed in the above-referenced patent disclosure, comprises first and second C-shaped electromagnetic coils and associated pole pieces. Each electromagnetic coil and its associated pole piece are attached to different frame members so that when the coils are alternately and sequentially energized with an electric current, the frame members rotatably dither back and forth in opposite directions.

Several problems are associated with the prior drive mechanism used in the multi-axis rate sensor. Although the frame members only rotate a few degrees in each direction, the first and second electromagnetic coils are energized by current supplied through leads that are continually flexed as a result of the dither motion of the device. Eventually, even the most flexible conductors available may work-harden and break. Since the coils are attached adjacent the periphery of the frame members, the mass and rotational inertia of the frame members are substantially increased by the addition of the coils, although an important design goal for this device was to *minimize* these parameters.

Conventional direct current electromagnetic motors capable of developing the torque required to drive the multi-axis rate sensor are comparatively bulky. Their bulk is necessary to accommodate permanent magnets, ferrus metal flux linkage members, and pole pieces that focus the magnetic flux across air gaps in the motor. A rotor in a conventional motor typically includes armature windings that are energized through brushes, which produce radio frequency (RF) noise and are subject to wear. The mass of such a rotor and its inertia prevent it from quickly stopping and reversing direction. Accordingly, a conventional prior art DC motor is not usable to drive the multi-axis rate sensor described above. Conventional motors are neither sufficiently compact, nor do they include a rotor that is sufficiently low in mass and inertia to rapidly rotate back and forth through a small incremental angle. Since a conventional DC motor cannot easily be adapted to this application, it has been necessary to develop a new type of motor that meets these design criteria for driving the multi-axis rate sensor. The present invention was specifically developed for that purpose, but it is believed to have advantages over prior art motors that make it useful for many other applications. The advantages of the present invention over the prior art will be apparent from the attached drawings and the Description of the Preferred Embodiments that follows.

SUMMARY OF THE INVENTION

In accordance with the present invention, a compact motor for providing opposed rotational driving torques comprises a generally X-shaped electromagnetic core that includes a first and second core section. Each core section has two diametrically opposite legs disposed about a common central axis. On the first core section are disposed first magnetic coil means for developing a magnetic flux within that core section when energized with an electric current so that opposite magnetic poles are produced at radially outer ends of the legs comprising the first core section. Similarly, second magnetic coil means are disposed on the second core section and are operative to develop a magnetic flux within the second core section when energized with an electrical current so that opposite magnetic poles are produced at radially outer ends of the legs comprising the second core section.

First pole piece means, disposed on one side of the electromagnetic core, magnetically link the opposite magnetic poles of the first and second core sections and include first tab means that are disposed proximate the legs of the first and second core sections. The first tab means define a plurality of surfaces that are attracted to the magnetic poles, causing rotation of the first pole piece means about the central axis. Second pole piece means are disposed on the opposite side of the electromagnetic core from the first pole piece means and also magnetically link the opposite magnetic poles of the first and second core sections. The second pole piece means include second tab means disposed proximate the legs of the first and second core sections, which are operative to define a plurality of surfaces that are attracted to the magnetic poles, causing the second pole piece means to rotate about the central axis in a direction opposite that in which the first pole piece means rotate.

The first and second pole piece means each comprise a magnetic flux conductive member extending across the electromagnetic core, generally through and transverse to the central axis. The first and second tab means are disposed proximate ends of the members and are integral with the members. In one preferred form of the invention, the first and second tab means are disposed adjacent opposite surfaces of the legs comprising the first and second core sections. Alternatively, in another preferred embodiment, the first and second tab means extend generally in a curvilinear arc about the central axis, partially overlapping the radially outer ends of the legs comprising the first and second core sections.

When the first and second magnetic coils are alternately energized with the electrical current, the first and second pole piece means are caused to counter-rotate back and forth. The electromagnetic core includes means for fixedly mounting it to a supporting structure, wherein the first and second pole piece means are mounted so as to rotate with respect to the supporting structure. Attraction of the first and second tab means to the magnetic poles develops torques applied to the first and second pole piece means that are substantially equal and opposite so that the compact motor is substantially reactionless with respect to transmitting torque to the supporting structure.

A further aspect of the invention is directed to a method for producing bi-directional torque to rotate two members in opposite directions. The method generally includes steps that involve carrying out the functions performed by the components of the compact motor, as explained above.

BRIEF DESCRIPTION OF THE DRAWINGS

FIG. 1 is an exploded view of a first embodiment of a compact torque motor comprising the present invention;

FIG. 2 is an isometric view of the assembled compact torque motor;

FIG. 3 is a plan view of the compact torque motor of FIGS. 1 and 2;

DESCRIPTION OF THE PREFERRED EMBODIMENTS

Figure 8:
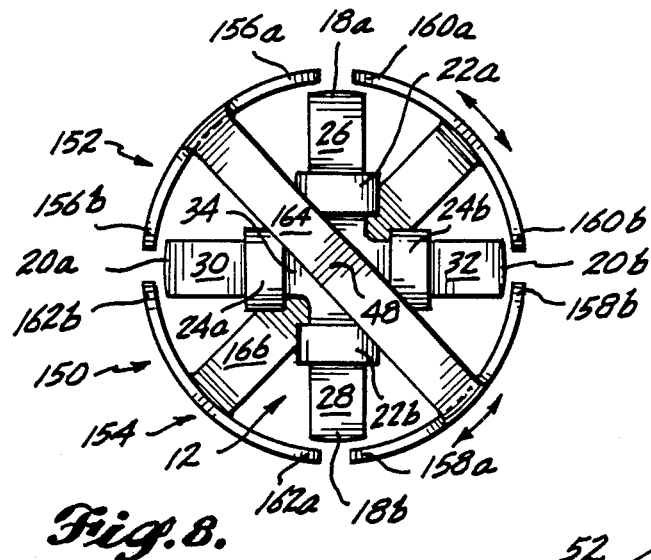
FIG. 8 is a plan view of a second preferred embodiment of the compact torque motor.

A first preferred embodiment of a torque motor 10, which is compact, lightweight, has relatively little rotational inertia, and is low in cost is shown in FIGS. 1, 2, and 3. In the exploded view of FIG. 1, it is readily apparent that the motor includes an X-shaped core 12, a first pole piece 14, and a second pole piece 16. FIGS. 2 and 3 show motor 10 as it appears when assembled, with first pole piece 14 suspended above X-shaped core 12 and second pole piece 16 suspended below the X-shaped core. Both the first and second pole pieces are attached to separate structures (not shown), which are able to counter-rotate relative to each other, about a central axis 48 of X-shaped core 12. When used as a drive mechanism for the multi-axis rate sensor discussed in the Background of the Invention, first pole piece 14 is connected to one generally hemispherically-shaped supporting member, and second pole piece 16 to another generally hemispherically-shaped supporting member, each of these members being connected to the other and to a base plate in which X-shaped core 12 is disposed so that the hemispherically-shaped supporting members are driven to counter-rotate relative to each other by motor 10. The first and second pole pieces and the X-shaped core preferably comprise laminated magnetic core material or solid ferromagnetic metal. The manner in which X-shaped core 12 is fixedly mounted relative to the first and second pole pieces is explained in greater detail below.

Preferably, X-shaped core 12 comprises a first core section 18, including opposed legs 18a and 18b, which are disposed at opposite sides of the X-shaped core, and generally lie along a longitudinal straight line. Similarly, a second core section 20 includes opposed legs 20a and 20b, lying on opposite sides of the X-shaped core. To maintain symmetry, the longitudinal axis of first core section 18 is perpendicular to that of second core section 20 in the preferred embodiment; however, the longitudinal axes of two core sections may be arranged to form other than a 90° angle without affecting the operation of motor 10.

First core section 18 further includes a first electromagnetic coil 22, which is divided into an electromagnetic coil 22a, disposed around first core section 18a, and an electromagnetic coil 22b, disposed around first core section 18b. Electromagnetic coils 22a and 22b are wound in series aiding relationship to that when energized with an electrical current, a magnetic pole 26 is formed at the end of first core section leg 18a and a magnetic pole 28 is formed at the end of first core section leg 18b. Similarly, second core section 20 includes a second electromagnetic coil 24, which is divided into an electromagnetic coil 24a, disposed around second core section leg 20a, and an electromagnetic coil 24b, disposed around second core section leg 20b. Electromagnetic coils 24a and 24b are also wound in series aiding relationship to provide a magnetic pole 30 at the end of second core section leg 20a and a magnetic pole 32 at the end of second core section leg 20b. It will be apparent that magnetic poles 26 and 28 are opposite in polarity to each other, and that magnetic poles 30 and 32 are opposite in polarity to each other. Thus, each leg of X-shaped core 12 includes its own electromagnetic coil and pairs of the coils lying around legs that are aligned with each other are energized with the same current to provide the opposite magnetic poles around a center section 34.

The magnetic flux generated by passing an electrical current through first and second electromagnetic coils 22 and 24 is conveyed respectively through first core section 18 and through second core section 20. However, first and second electromagnetic coils 22 and 24 are *not* simultaneously energized, but instead, are alternately and sequentially energized, causing first and second pole pieces 14 and 16 to counter-rotate back and forth, as shown by the arrows in FIG. 3.

First pole piece 14 preferably includes a flux linkage member 36 that extends diametrically across X-shaped core 12 and serves to convey magnetic flux developed when either the first or second electromagnetic coil 22 or 24 is energized with electrical current. At one end of flux linkage member 36 are disposed tabs 38a and 38b; at the other end are disposed tabs 40a and 40b. Each of tabs 38 and 40 are bent downwardly, forming approximately a 90° angle relative to the planar surface of flux linkage member 36 and relative to a plane in which first pole piece 14 rotates back and forth.

Similarly, second pole piece 16 comprises a flux linkage member 42 having tabs 44a and 44b disposed at one end, and tabs 46a and 46b disposed at the other end. Tabs 44 and 46 are bent upwardly at an angle of approximately 90° relative to the planar surface of flux linkage member 42 and relative to the plane in which the second pole piece rotates back and forth. The tabs on first and second pole pieces 14 and 16 are disposed adjacent opposite surfaces of each magnetic pole 26, 28, 30, and 32. When electrical current flows through first electromagnetic coil 22, both flux linkage members 36 and 42 convey magnetic flux between magnetic poles 26 and 28. Likewise, whenever second electromagnetic coil 24 is energized with an electrical current, the flux linkage members convey magnetic flux between magnetic poles 30 and 32. Energization of first electromagnetic coil 22 causes tabs 38b and 44a to be attracted to opposite surfaces of magnetic pole 26 and tabs 40a and 46a to be attracted to opposite surfaces of magnetic pole 28. The magnetic attraction of magnetic poles 26 and 28 thus causes first pole piece 14 to rotate clockwise and second pole piece 16 to rotate counterclockwise (as viewed in FIG. 3).

When electrical current is applied to second electromagnetic coil 24, tabs 38a and 46b are both attracted to opposite surfaces of magnetic pole 30, while tabs 40b and 44b are attracted to opposite surfaces of magnetic pole 32. As a result, first pole piece 14 rotates counterclockwise, and second pole piece 16 rotates clockwise (as viewed in FIG. 3). It will be apparent that first and second pole pieces 14 and 16 can only rotate through small incremental angles, since relatively small air gaps separate tabs 38, 40, 44, and 46 from the magnetic poles. However, the small size of the air gaps between the tabs and the magnetic poles ensures that substantial torque is applied to counter-rotate any members attached to the first and second pole pieces.

Both pole pieces rotate about central axis 48 (represented by the long/short dash line in FIGS. 1 and 2). Since both first and second pole pieces 14 and 16 are substantially equivalent in mass and counter-rotate in opposite directions when the first and second electromagnetic coils are alternately energized, the two torques developed to rotate the first and second pole pieces are opposite in direction, and substantially cancel. Consequently, virtually no torque is transmitted to X-shaped core 12, or to the structure on which it is mounted. Motor 10 is thus reactionless with respect to its supporting structure.

A significant advantage of first and second pole pieces 14 and 16 is that the same flux linkage members 36 and 42 are used to carry magnetic flux for both the first and second electromagnetic coils 22 and 24. Thus, the mass of either first or second pole piece 14 and 16 is substantially less than the mass of a second embodiment of a pole piece, which is shown in FIGS. 4 and 5.

Figure 4:
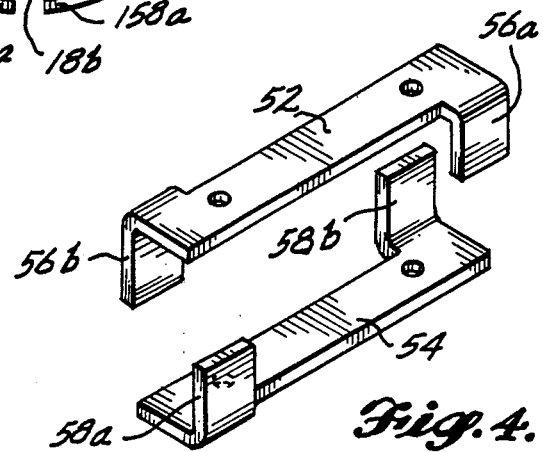
FIG. 4 is an isometric view of two parts used in an alternative pole piece for the first embodiment.
Figure 5:
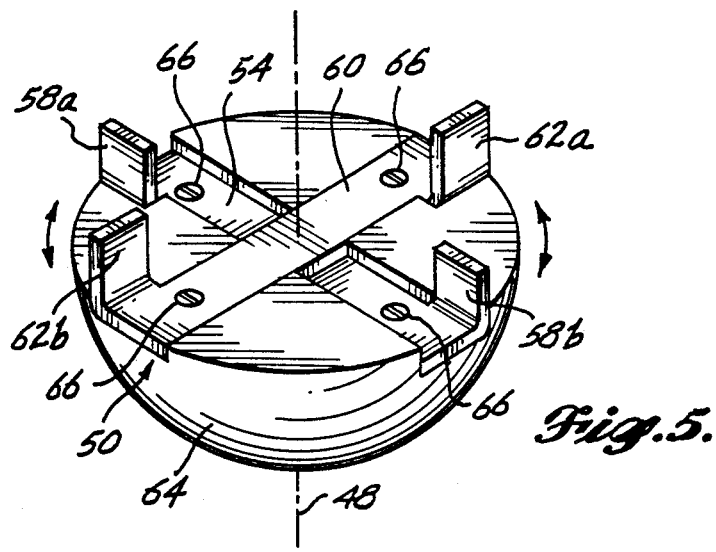
FIG. 5 is an isometric view of the alternative pole piece referenced in FIG. 4, following assembly and attachment to a member that is rotated by the compact torque motor.

In FIG. 4, a flux linkage member 52 and a flux linkage member 54 are cut from a generally rectangular tube of electromagnetic core material (not shown) that is formed of laminated layers of core material wrapped around a square mandrel (not shown). Flux linkage member 52 comprises one-half of a second pole piece 50 shown in FIG. 5, while flux linkage member 54 is used as one-half of the first pole piece (not shown).

Second pole piece 50 includes flux linkage member 52 and an equivalent flux linkage member 60, secured at right angles to each other. As shown in FIG. 5, second pole piece 50 is mounted on a hemispherically-shaped structure 64. Each of the flux linkage members are secured in place using machine screws 66 so that as the flux linkage members rotate back and forth, hemispherically-shaped structure 64 also rotates. Flux linkage member 54 includes a tab 58a and formed at one end, along one side of the flux linkage member, and a tab 58b, formed on the opposite side at the other end of the flux linkage member. Similarly, flux linkage member 60 includes tabs 62a and 62b disposed at opposite ends and on opposite sides of the flux linkage member. It will be apparent that second pole piece 50 has substantially greater mass than second pole piece 16, and is thus less preferred; but, it is included to illustrate that other pole piece configurations may be used.

The first and second pole piece each provide a return path for magnetic flux between corresponding diametrically opposed magnetic poles. Since the return paths for the magnetic flux crossing X-shaped core 12 are spaced apart from its upper and lower surfaces by a distance equal to at least four times the maximum air gaps separating the tabs on the various pole pieces and the magnetic poles of first and second core sections 18 and 20, flux leakage across the X-shaped core is minimal, reducing the available torque of the motor by less than five percent. The configuration of the magnetic flux return path provided by the pole pieces is thus relatively efficient, compared to conventional motors.

Perhaps the most significant advantage of motor 10 is its use of extremely lightweight first and second pole pieces. The rotational inertia of first and second pole pieces 14 and 16 is less than one-third that of a wound armature in a typical permanent magnet DC-type motor producing a torque equivalent to that of motor 10. In addition, since first and second electromagnetic coils 22 and 24 are stationary, and since electrical power is not provided to windings around any rotating assembly, electrically conductive leads (not shown) that provide electrical current to motor 10 are not subject to flexing due to the dither motion of the motor, and brushes are not needed.

Figure 7:
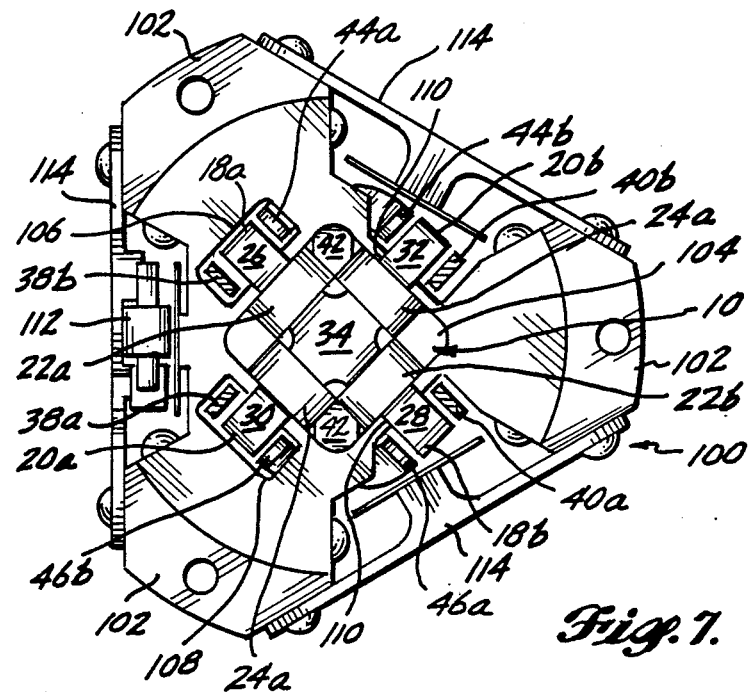
FIG. 7 is a plan view of the base plate of FIG. 6, following installation of the compact motor, wherein the top pole piece of the compact torque motor is sectioned and removed to better disclose the components.
Figure 6:
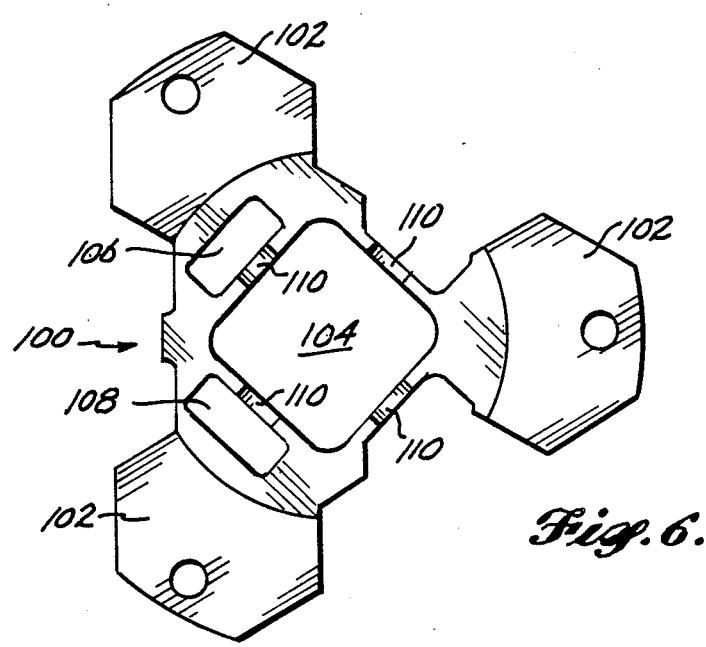
FIG. 6 is a plan view of a base plate, prior to installation of the compact torque motor.

Although other applications may exist for motor 10, it was specifically developed to drive the multi-axis rate sensor disclosed in commonly assigned U.S. Pat. No. 4,821,572, the specification of which is hereby specifically incorporated herein by reference. To accommodate mounting of X-shaped core 12 to the multi-axis rate sensor, a base plate 100 used in that device was formed, as shown in FIGS. 6 and 7. In FIG. 6, base plate 100 of the multi-axis rate sensor is shown prior to mounting motor 10. Base plate 100 includes three radially extending support tabs 102, which are intended to mount to the body for which angular rate and linear acceleration along three orthogonal axes is to be determined. The base plate includes a generally squared-shaped core cavity 104, proximate its center and two pole piece cavities 106 and 108, disposed adjacent to two sides of core cavity 104. Centered in each side of core cavity 104 are radially-aligned rectangular slots 110, which are sized to accommodate first and second core sections 18 and 20.

As shown in FIG. 7, X-shaped core 12 is mounted in the center of core cavity 104, so that magnetic poles 26, 28, 30, and 32 extend radially beyond slots 110, with each of the first and second electromagnetic coils 22 and 24 abutting against the sides of core cavity 104. In this figure, first pole piece 14 is sectioned so that only a portion of tabs 38 and 40 are shown, adjacent one side of each of the magnetic poles. However, flux linkage member 42 is partially exposed through open areas of core cavity 104, as are the ends of tabs 44 and 46. To clarify the positioning of X-shaped core 12 in base plate 100, the base plate has been simplified, and only a portion of the additional hardware used in the multi-axis rate sensor shown. Not shown are the hemispherically-shaped structures in which are mounted the accelerometers that produce the signals from which angular rate and linear acceleration are determined. The hemispherically-shaped structures are disposed adjacent the top and bottom surfaces of base plate 100 and each is attached to one of the first and second pole pieces, generally as shown in FIG. 5, with respect to second pole piece 50. However, instead of using machine screw fasteners, first and second pole pieces 14 and 16 are preferably press fit and clamped in the respective hemispherically-shaped structures that they rotate.

To prevent tabs 38, 40, 44, and 46 from striking against opposed surfaces of magnetic poles 26, 28, 30, and 32, a linear variable displacement transformer (LVDT) 112 is attached to monitor the rotational or angular displacement of the hemispherically-shaped structures. The signal produced by the LVDT is used to control the electrical current applied to first and second electromagnetic coils 22 and 24, to modulate the torque developed by motor 10, thereby limiting the angular rotation of first and second pole pieces 14 and 16 to prevent actual contact between tabs 38, 40, 44, and 46 from their respective adjacent magnetic poles. Linkage support bars 114 extend between support tabs 102, and comprise a portion of the flexible linkage system that rotatably connects the hemispherically-shaped structures to base plate 100, suspending them adjacent opposite surfaces of the base plate. Since the elements of the multi-axis rate sensor associated with base plate 100, such as linkage support bars 114, do not directly relate to the present invention, they are not further discused herein.

Referring to FIG. 8, a second embodiment of a motor in accordance with the present invention is shown generally at reference numeral 150. Motor 150 includes X-shaped core 12 and first and second electromagnetic coils 22 and 24, just as provided in motor 10. However, motor 150 includes a first pole piece 152 and a second pole piece 154 that differ significantly from first and second pole pieces 14 and 16 that are used in motor 10. Specifically, first pole piece 152 includes tabs 152a and 156b that extend in opposite directions in a curvilinear arc from one end of a flux linkage member 164, and tabs 158a and 158b that extend in a matching curvilinear arc at the opposite end of the flux linkage member. Flux linkage member 164 extends diametrically across the top of X-shaped core 12 as shown in FIG. 8, and is sufficiently long so that tabs 156 and 158 depend downwardly from a plane of rotation or planar surface thereof and partially overlap the radially outermost ends of magnetic poles 26, 28, 30, and 32. Similarly, second pole piece 154 includes tabs 160a and 160b that extend around a curvilinear arc at one end of a flux linkage member 166 and tabs 162a and 162b extending in a curvilinear arc at the other end of the flux linkage member. Tabs 160 and 162 are bent upwardly relative to a plane of rotation or planar surface of flux linkage member 166 so that they also partially overlap the radially outermost ends of the magnetic poles.

When first electromagnetic coil 22 is energized with an electrical current, the magnetic flux developed in magnetic poles 26 and 28 is conveyed through tab 158a, flux linkage member 164, and tab 156a. In addition, the magnetic flux is also conveyed through tab 162a, flux linkage member 166, and tab 160a. The magnetic force developed at magnetic poles 26 and 28 causes first and second pole pieces 152 and 154 to counter-rotate so as to increase the extent of overlap of the above referenced tabs over the radially outermost ends of magnetic poles 26 and 28. Similarly, when an electrical current is provided through second electromagnetic coil 24, the magnetic flux produced is conveyed through the overlapping tabs and through both of the flux linkage members 164 and 166 between opposite magnetic poles 30 and 32. The attraction of the magnetic field causes first and second pole pieces 152 and 154 to counter-rotate back in the opposite direction. Repetitively, alternately energizing electromagnetic coils 22 and 24 develops the bi-directional dither motion represented by the arrows in FIG. 8.

Motor 150 has several disadvantages, compared to motor 10, including less torque and slightly greater rotational inertia due to the greater mass in each of tabs 156, 158, 160, and 162, compared to the tabs used on the first and second pole pieces 14 and 16. For this reason, motor 10 represents a more preferred embodiment than motor 150.

Other variations in the shape of the electromagnetic core and in the pole pieces used in the present invention are contemplated within the scope of the claims that follow. For example, first and second pole pieces 14 and 16 could be formed so that their tabbed ends subtend a relatively longer arc, thereby positioning the tabs adjacent the outer sides of the magnetic poles, i.e., opposite sides from those shown in FIGS. 1, 2, and 3. Again, this would create a disadvantage by increasing the rotational inertia of the first and second pole pieces, since additional pole piece material would be required to extend the distance between the tabs at each end of the pole pieces. It should further be evident that a motor could be made like motor 10, but having only one pole piece and the X-shaped core; however, such a motor would not be usable to drive the present multi-axis rate sensor.

While the present invention has been described with respect to several preferred embodiments, those of ordinary skill in the art will recognize that further modifications may be made thereto within the scope of the claims that follow. Accordingly, it is not intended that the invention be in any way limited by the disclosure, but instead that its scope be determined entirely by reference to the claims.

The embodiments of the invention in which an exclusive property or privilege is claimed are defined as follows:

1. A torque motor comprising:
  (a) an electromagnetic core including two pairs of outwardly extending legs arranged around a central axis, a radially outer end of one leg of each pair of legs being disposed diametrically opposite a radially outer end of the other leg of the pair;
  (b) a first multi-turn coil disposed around one pair of legs, said first multi-turn coil being operative, when energized with an electrical current, to cause the radially outer ends of said one pair of legs to become opposite magnetic poles;
  (c) a second multi-turn coil disposed around the other pair of legs, said second multi-turn coil being operative, when energized with an electrical current, to cause the radially outer ends of said other pair of legs to become opposite magnetic poles; and
  (d) a first pole piece mounted to rotate bi-directionally about the central axis relative to the electromagnetic core, said first pole piece extending diametrically across the electromagnetic core and including a pair of tabs disposed generally at opposite ends of the first pole piece, each tab being disposed proximate one of the legs, so that when the first multi-turn coil is energized with the electrical current, two of the tabs disposed at opposite ends of the first pole piece are attracted to the magnetic poles of said one pair of legs, causing the first pole piece to rotate about the central axis in a first direction relative to the electromagnetic core, and when the second multi-turn coil is energized, two other tabs of the first pole piece are attracted to the magnetic poles of said other pair of legs, causing the first pole piece to rotate in a second direction about the central axis, opposite the first direction.

2. The torque motor of claim 1, wherein the first electromagnetic coil is split into two parts, each part being disposed on a different one of the legs of said one pair of legs, and wherein the second electromagnetic coil is split into two parts, each part being disposed on a different one of the legs of said other pair of legs.

3. The torque motor of claim 1, further comprising a second pole piece disposed on an opposite side of the electromagnetic core from the first pole piece and mounted to rotate bi-directionally about the central axis relative to the electromagnetic core, said second pole piece extending diametrically across the electromagnetic core and including a pair of tabs disposed generally at opposite ends of the second pole piece, each tab being disposed proximate one of the legs, so that when the first multi-turn coil is energized with the electrical current, two of the tabs disposed at opposite ends of the second pole piece are attracted to the magnetic poles of said one pair of legs, causing the second pole piece of rotate in the second direction about the central axis relative to the electromagnetic core, and when the second multi-turn coil is energized, two other tabs of the second pole piece are attracted to the magnetic poles of said other pair of legs, causing the second pole piece to rotate in the first direction about the central axis.

4. The torque motor of claim 3, wherein the tabs of the first and the second pole pieces are formed at an angle relative to planes in which the first and the second pole pieces respectively rotate about the central axis, each tab of the first pole piece extending toward the plane in which the second pole piece rotates and each tab of the second pole piece extending toward the plane in which the first pole piece rotates, tabs of the first and the second pole being disposed adjacent opposite surfaces of the legs of the electromagnetic core.

5. The torque motor of claim 3, wherein the tabs of the first and the second pole pieces are formed in a curvilinear arc about the central axis, and partially overlap the radially outer ends of the legs of the electromagnetic core.

6. The torque motor of claim 3, wherein the first pole piece and the second pole piece each comprise a flux linkage path between the magnetic poles for a magnetic flux that is developed when the first and the second multi-turn coils are energized with the electrical current.

7. The torque motor of claim 3, wherein the first and the second multi-turn coils are alternately energized with the electrical current to cause the first and the second pole pieces to incrementally counter-rotate back and forth with respect to each other.

8. A compact motor for providing opposed rotational driving torques, said motor comprising:
(a) a generally X-shaped electromagnetic core including a first core section and a second core section, each core section comprising two diametrically opposite legs disposed about a common central axis;
(b) first magnetic coil means, disposed on the first core section, for developing a magnetic flux within the first core section when energized with an electrical current, so that opposite magnetic poles are produced at radially outer ends of the legs comprising the first core section;
(c) second magnetic coil means, disposed on the second core section, for developing a magnetic flux within the second core section when energized with an electrical current, so that opposite magnetic poles are produced at radially outer ends of the legs comprising the second core section;
(d) first pole piece means, disposed on one side of the electromagnetic core, for magnetically linking the opposite magnetic poles of the first and the second core sections, said first pole piece means including first tab means, disposed proximate the legs of the first and second core sections, for defining a plurality of surfaces that are attracted to the magnetic poles, causing rotation of the first pole piece means about the central axis; and
(e) second pole piece means, disposed on an opposite side of the electromagnetic core from the first pole piece means, for magnetically linking the opposite magnetic poles of the first and the second core sections, said second pole piece means including second tab means, disposed proximate the legs of the first and second core sections, for defining a plurality of surfaces that are attracted to the magnetic poles, causing the second pole piece means to rotate about the central-axis in a direction opposite that in which the first pole piece means rotate.

9. The compact motor of claim 8, wherein the first and the second pole piece means each comprise a magnetic flux conductive member extending across the electromagnetic core, generally through and transverse to the central axis, and wherein the first and the second tab means are disposed proximate ends of said members.

10. The compact motor of claim 9, wherein the first and the second tab means are integral with said members and extend generally adjacent opposite surfaces of the legs comprising the first and the second core sections.

11. The compact motor of claim 9, wherein the first and the second tab means are integral with the members and extend generally in a curvilinear arc about the central axis, partially overlapping the radially outer ends of the legs comprising the first and second core sections.

12. The compact motor of claim 11, wherein when the first magnetic coil means are energized with the electrical current, the extent of which the first and the second tab means overlap the radially outer ends of the legs of the first core section increases, and wherein when the second magnetic coil means are energized with the electrical current, the extent to which the first and the second tab means overlap the radially outer ends of the legs of the second core section increases.

13. The compact motor of claim 8, wherein the first and second magnetic coils are alternately energized with the electrical current to cause the first and the second pole piece means to incrementally counter-rotate back and forth.

14. The compact motor of claim 13, wherein the electromagnetic core includes means for fixedly mounting it to a supporting structure, wherein the first and the second pole piece means are mounted so as to rotate with respect to the supporting structure, and wherein attraction of the first and second tab means to the magnetic poles develops torque applied to the first and second pole piece means that are substantially equal and opposite, so that the motor is substantially reactionless with respect to transmitting torque to the supporting structure.

15. The compact motor of claim 8, wherein the first and the second magnetic coil means each include coils of electrical conductor disposed about the diametrically opposite legs of the respective first and the second core sections.

16. A method for producing a bi-directional torque to rotate two members in opposite directions about a central axis, said method comprising the steps of:
  (a) selectively producing a magnetic flux in a first core section that extends transversely through the central axis and has radially outer ends extending from the central axis, so that the radially outer ends of the first core section comprise opposite magnetic poles;
  (b) selectively producing a magnetic flux in a second core section that extends transversely through the central axis and the first core section, and has radially outer ends extending from the central axis, so that the radially outer ends of the second core section comprise opposite magnetic poles; and
  (c) magnetically linking the opposite magnetic poles of the first and second core sections through one of the members, so that opposite ends of said one member are attracted to the magnetic poles of the first core section when the magnetic flux is selectively produced in it, and are attracted to the magnetic poles of the second core section when the magnetic flux is selectively produced in it, said one member rotating back and forth between the first and the second core sections in response to the magnetic flux produced therein.

17. The method of claim 16, wherein the step of selectively producing magnetic flux in the first core section comprises the step of supplying an electrical current to a magnetic coil that is disposed on the first core section, to induce the magnetic flux within the first core section, and wherein the step of selectively producing magnetic flux in the second core section comprises the step of supplying an electrical current to a magnetic coil that is disposed on the second core section, to induce the magnetic flux within the second core section.

18. The method of claim 17, further comprising the steps of alternately supplying the electrical current to one of the magnetic coils of the first and second core sections, and then to the other magnetic coil on the first and second core sections.

19. The method of claim 16, further comprising the step of magnetically linking the opposite magnetic poles of the first core section and the second core sections through the other of the members, so that opposite ends of said other member are attracted to the magnetic poles of the first core section when the magnetic flux is selectively produced in it, and are attracted to the magnetic poles of the second core section when the magnetic flux is selectively produced in it, said other member rotating back and forth between the first and the second core sections in a direction opposite to that of said one member, in response to the magnetic flux produced within the first and second core sections.

20. The method of claim 19, wherein the torque applied to the first member as a result of the magnetic flux produced within the first and second core sections is substantially equal and opposite to the torque applied to the second member as a result of the magnetic flux produced within the first and second core sections, so that the substantially no torque is transmitted to a supporting structure as the first and second members counter-rotate back and forth.

* * * * *